United States Patent
Ozolins et al.

(10) Patent No.: US 9,475,564 B2
(45) Date of Patent: Oct. 25, 2016

(54) SYSTEM AND METHOD FOR DETERMINING ENGINE FUEL LIMITS

(71) Applicant: General Electric Company, Schenectady, NY (US)

(72) Inventors: Jason Daniel Ozolins, Lawrence Park, PA (US); John Patrick Dowell, Grove City, PA (US); Suseel Sukumaran, Bangalore (IN); Greg Thomas Polkus, Waukesha, WI (US); Atul George Tharakan, Bangalore (IN)

(73) Assignee: General Electric COmpany, Schenectady, NY (US)

( * ) Notice: Subject to any disclaimer, the term of this patent is extended or adjusted under 35 U.S.C. 154(b) by 131 days.

(21) Appl. No.: 13/888,449

(22) Filed: May 7, 2013

(65) Prior Publication Data

US 2014/0336852 A1 Nov. 13, 2014

(51) Int. Cl.
*B63H 21/21* (2006.01)
*B63H 21/22* (2006.01)
*B63J 99/00* (2009.01)
*F02D 41/24* (2006.01)

(52) U.S. Cl.
CPC .............. *B63H 21/21* (2013.01); *B63H 21/22* (2013.01); *F02D 41/2422* (2013.01); *F02D 41/2432* (2013.01); *B63J 2099/006* (2013.01); *F02D 41/2416* (2013.01); *F02D 2200/0614* (2013.01); *F02D 2200/0625* (2013.01); *F02D 2200/101* (2013.01)

(58) Field of Classification Search
CPC ...................................................... B63H 21/21
USPC ........................................................... 701/21
See application file for complete search history.

(56) References Cited

U.S. PATENT DOCUMENTS

| | | | | |
|---|---|---|---|---|
| 5,819,196 A * | 10/1998 | Holmes | ............... | F02D 41/2464 701/103 |
| 5,931,143 A * | 8/1999 | Kitagawa | ............ | F02D 41/1402 123/674 |
| 6,102,005 A * | 8/2000 | Kasen | ..................... | F02D 41/38 123/446 |
| 6,474,299 B1 * | 11/2002 | Langer | ................ | F02D 41/1497 123/352 |
| 6,493,627 B1 * | 12/2002 | Gallagher | ............... | F02D 41/38 123/480 |
| 6,557,530 B1 * | 5/2003 | Benson | ................... | F02D 41/22 123/447 |
| 6,823,834 B2 * | 11/2004 | Benson | ................... | F02D 41/22 123/299 |
| 6,848,426 B2 * | 2/2005 | Kumar et al. | ................ | 123/480 |
| 6,950,740 B1 * | 9/2005 | Cook | ............................ | 701/104 |
| 7,047,938 B2 * | 5/2006 | Flynn | ................. | F02D 41/1402 123/352 |
| 7,315,778 B1 * | 1/2008 | Kumar | ................ | F02D 41/1497 123/357 |
| 7,426,917 B1 * | 9/2008 | Gallagher | ............... | B61L 3/006 123/299 |
| 7,490,000 B2 * | 2/2009 | Siddiqui et al. | ............. | 701/104 |
| 7,497,201 B2 * | 3/2009 | Hollenbeck | ................... | 123/435 |
| 7,774,130 B2 * | 8/2010 | Pepper | .......................... | 701/123 |
| 8,340,925 B2 * | 12/2012 | Higgins et al. | ................. | 702/45 |
| 8,676,476 B2 * | 3/2014 | Malikopoulos | ...... | F02D 41/1406 701/102 |
| 2003/0041843 A1 * | 3/2003 | Shinogle | ............. | F02D 41/2467 123/486 |
| 2011/0307190 A1 * | 12/2011 | Higgins et al. | ................. | 702/45 |
| 2013/0166121 A1 * | 6/2013 | Takeuchi et al. | ............... | 701/22 |

* cited by examiner

*Primary Examiner* — Jerrah Edwards
*Assistant Examiner* — Majdi Alsomiri
(74) *Attorney, Agent, or Firm* — GE Global Patent Operation (57) ABSTRACT

A method of determining fuel limits for an engine includes measuring an actual fuel value for the engine and creating a plurality of engine speed points. The method further includes calculating respective static fuel limit points for each of the engine speed points utilizing the actual fuel value. The static fuel limit points define and limit a rated power of the engine.

22 Claims, 6 Drawing Sheets

FIG. 1

| Application Type: | OLF | FLP0 (Stop Speed) | | FLP1 (Min. Speed Max Load) | | | FLP2 (MID-Speed Max Load) | | | FLP3 (Fuel Stop Power) | | | FLP4 (Overspeed Max Load) | | | FLP5 (Max Speed No Load) | | |
|---|---|---|---|---|---|---|---|---|---|---|---|---|---|---|---|---|---|---|
| | 4 | 5 | 6 | 7 | 8 | 9 | 10 | 11 | 12 | 13 | 14 | 15 | 16 | 17 | 18 | 19 | 20 | 21 |
| | OLF | SF | LF | SF | LF | Exp | SF | LF | Exp | SF | LF | Exp | SF | LF | Exp | SF | LF | Exp |
| FPP | 1.00 | 0.0500 | 0.0000 | 0.3000 | 0.0700 | 1.2000 | 0.9000 | 0.9090 | 3.0000 | 1.00 | 1.01 | 1.00 | 1.03 | 1.01 | 1.00 | 1.05 | 0.00 | 1.00 |
| FPP-HT 1050 | 1.00 | 0.0500 | 0.0000 | 0.3000 | 0.0700 | 1.2000 | 0.5500 | 0.5555 | 4.0000 | | | | | | | 1.05 | 0.00 | 1.00 |
| FPP-HT 1000 | 1.00 | 0.0500 | 0.0000 | 0.3000 | 0.0700 | 1.2000 | 0.5600 | 0.5656 | 4.0000 | 1.00 | 1.01 | 1.00 | 1.03 | 1.01 | 1.00 | 1.05 | 0.00 | 1.00 |
| FPP-HT 900 | 1.00 | 0.0500 | 0.0000 | 0.3000 | 0.0700 | 1.2000 | 0.6700 | 0.6767 | 4.0000 | | | | | | | 1.05 | 0.00 | 1.00 |
| CPP/EPP-VS | 1.00 | 0.0500 | 0.0000 | 0.3000 | 0.0700 | 1.2000 | 0.9000 | 0.9090 | 3.0000 | 1.00 | 1.01 | 1.00 | 1.03 | 1.01 | 1.00 | 1.05 | 0.00 | 1.00 |
| CPP/EPP-CS | 1.00 | 0.0500 | 0.0000 | 0.1000 | 0.0000 | 3.0000 | 0.9300 | 0.9765 | 3.0000 | 1.00 | 1.05 | 1.00 | 1.00 | 1.05 | 1.00 | 1.05 | 0.00 | 1.00 |
| GEN | 1.00 | 0.0500 | 0.0000 | 0.1000 | 0.0000 | 3.0000 | 0.9300 | 0.9765 | 3.0000 | 1.00 | 1.05 | 1.00 | 1.00 | 1.05 | 1.00 | 1.05 | 0.00 | 1.00 |

FIG. 2

| | N | Fuel Value mm^3/Stroke |
|---|---|---|
| 1 | 0.05 | 0 |
| 2 | 0.10 | 470 |
| 3 | 0.15 | 590 |
| 4 | 0.20 | 631 |
| 5 | 0.25 | 643 |
| 6 | 0.30 | 641 |
| 7 | 0.35 | 810 |
| 8 | 0.40 | 1040 |
| 9 | 0.45 | 1326 |
| 10 | 0.50 | 1669 |
| 11 | 0.55 | 2064 |
| 12 | 0.60 | 2064 |
| 13 | 0.65 | 2064 |
| 14 | 0.55 | 2064 |
| 15 | 0.70 | 2064 |
| 16 | 0.75 | 2064 |
| 17 | 0.80 | 2064 |
| 18 | 0.85 | 2064 |
| 19 | 0.90 | 2064 |
| 20 | 0.93 | 2064 |
| 21 | 0.95 | 2064 |
| 22 | 1.00 | 2064 |
| 23 | 1.03 | 2004 |
| 24 | 1.05 | 0 |

SYSTEM AND METHOD FOR DETERMINING ENGINE FUEL LIMITS

BACKGROUND

1. Technical Field

Embodiments of the invention relate to determining engine fuel limits, such as those in marine propulsion systems.

2. Discussion of Art

Marine propulsion systems typically include a diesel engine and a fixed or controllable pitch propeller. In the United States, marine diesel engines must meet U.S. EPA (Environmental Protection Agency) emissions regulations since they emit, among other things, nitrogen oxide and particulate matter. Emissions testing for EPA compliance utilizes a marine engine's maximum rated power. In particular, maximum engine power curves are used in determining duty cycles for test purposes.

Known methods of creating marine engine power curves use static fuel limit tables. These tables, which typically reside in an engine's ECU (engine control unit), limit the amount of fuel that can be injected into an engine and thereby limiting its power. Fuel limit tables are created based on performance data taken from an exemplary test engine and do not take into consideration engine to engine variation in fueling amounts. As a result, different production engines of the same type or model can have varying maximum powers. This varying engine power requires revisions to engine control unit software to create new fuel limit tables for underperforming engines. Moreover, EPA emissions regulations only allow for a relatively small degree of variation in maximum engine power for emissions testing.

Furthermore, known methods of creating engine power curves do not allow users to vary the curve based on vessel requirements. Similarly, known methods do not account for the application type for which the engine will be used.

As will be appreciated, it is desirable to create engine fuel limits that take into consideration engine to engine fueling variances and to be able to easily modify or customize the same. It is also desirable that all engines of a specific type or model produce the same power at any given speed.

BRIEF DESCRIPTION

In embodiments, a method of determining fuel limits for an engine includes measuring an actual fuel value for the engine and creating a plurality of engine speed points. The method further includes calculating a static fuel limit point for each of the engine speed points utilizing the actual fuel value. The static fuel limit points define and limit the engine's rated power.

In embodiments, a method for modifying an engine fuel limit curve includes receiving at an electronic control unit of an engine, a value for a configurable parameter into an engine's electronic control unit and calculating respective static fuel limit points for each of a plurality of engine speed points utilizing an actual fuel value for the engine as well as the configurable parameter. The static fuel limit points define and limit a rated power of an engine.

In an embodiment, an engine control system includes an engine control unit and a storage device electrically connected to the engine control unit, the electronic storage device comprising a non-transient tangible medium having machine readable instructions stored thereon that when executed by the engine control unit cause the engine control unit to calculate respective static fuel limit points for each of a plurality of engine speed points utilizing an actual fuel value for an engine, the static fuel limit points defining and limiting a rated power of the engine.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts. Although embodiments of the present invention are described as intended for use with marine propulsion systems, it will be appreciated that embodiments may be adapted for use with other engine applications, such as, for example, off highway vehicles and the like.

Figure 1:
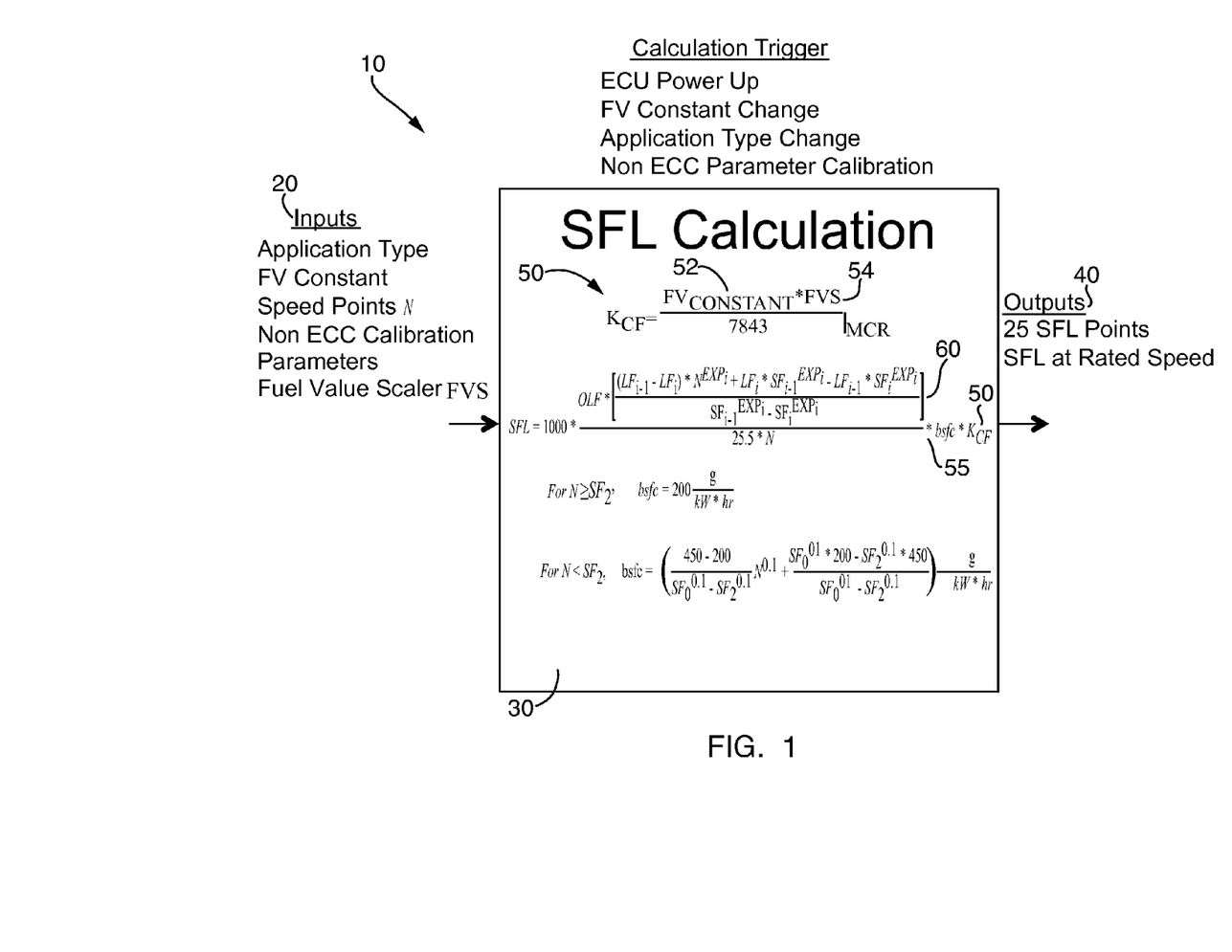
FIG. 1 is a graphical illustration of a method for determining engine fuel limits according to an embodiment of the present invention.

Referring to FIG. 1, an embodiment of the inventive method for creating a static fuel limit curve for an engine is graphically depicted. As shown, the method 10 includes receiving multiple inputs 20 into an engine control unit (ECU) or other processor-based unit (discussed in more detail below), which is configured to process the multiple inputs 20 as part of a static fuel limit (SFL) equation 30. (For example, the multiple inputs 20 may be entered into the ECU or other processor-based unit by an operator, or the multiple inputs may be received electronically from a non-transitory/non-volatile storage medium, received electronically from another machine system/sub-system, or the like.) These inputs 20 include, among other things, the application type for which the engine is to be used, as well as a measured actual fuel value at maximum continuous rating (MCR) for the specific engine. The actual fuel value is referred to herein as $FV_{CONSTANT}$ and is expressed as $mm^3$/stroke.

In an embodiment, the $FV_{CONSTANT}$ value is obtained via testing of a new engine having an ECU with default fuel limits. In particular, an operator measures the amount of fuel consumed by the engine in mass flow per unit of power output at MCR speed and load for the engine. The fuel value obtained from this measurement is the $FV_{CONSTANT}$ and is then entered into the ECU. The $FV_{CONSTANT}$ value may also be attached to, or incorporated into, the engine serial number, stored in a storage medium accessible to the ECU, or otherwise.

The inputs 20 further include engine speed points referred to herein as N. As shown, the method involves an SFL calculation for each speed point N., e.g., the ECU is configured to calculate plural respective static fuel limit points for the plural engine speed points. Thus, the outputs 40 that result from the SFL calculation include SFL points. For example, in the embodiment of FIG. 1, there are 25 SFL points, one for each of 25 engine speed points N. As will be described in greater detail herein, the SFL points are used to create the static fuel limit curve that is used to define and limit the engine's power. Though an embodiment utilizes 25 engine speed points, other numbers of points may be employed. The fewer the points, the lower the processing requirements are for the ECU. The greater number of points, the more accurate the resulting static fuel curve, which is created through linear interpolation. Though 25 speed engine points is believed to provide a balance between reasonably fast operational/computational throughput and suitable accuracy of the static fuel limit curve, a range of 20-30 speed engine points would be suitable. However, in other embodiments, there are more than 25 engine speed points and static fuel limit points, and in yet further embodiments, there are fewer than 25 engine speed points and static fuel limit points.

As stated, the engine application as well as the engine specific $FV_{CONSTANT}$ are taken into consideration when creating the static fuel limit curve. More specifically, an embodiment of the present invention employs the equation set forth in FIG. 1 and reproduced below, to calculate SFL points for N speed points.

$$SFL = 1000 * \frac{OLF * \left[ \frac{(LF_{i-1} - LF_i) * N^{EXP_i} + LF_i * SF_{i-1}^{EXP_i} - LF_{i-1} * SF_i^{EXP_i}}{SF_{i-1}^{EXP_i} - SF_i^{EXP_i}} \right]}{25.5 * N} * bsfc * K_{CF}$$

The SFL equation 30 includes an engine power map expression 60, $K_{CF}$ equation 50, which includes $FV_{CONSTANT}$ 52 and a fuel value scaler, FVS 54. The SFL equation 30 also includes a brake specific fuel consumption equation, bsfc. As shown, the SFL equation also includes the engine speed point N for which the equation is being run. (That is, for each engine speed point N, the SFL equation is run, resulting in a respective static fuel limit point for that engine speed point.)

The engine speed points N are MCR normalized in certain embodiments. That is, each N point is the raw engine speed divided by the MCR engine speed. So, for example, if the raw engine speed is 500 rpm and the MCR engine speed is 1000 rpm, the engine speed point N, as used in the SFL calculation, would be 0.5. As noted above, a plurality of N engine speed points are used, and, in an embodiment, 25 N engine speed points are employed. As will be appreciated, in this embodiment, 25 respective SFL points are obtained for the 25 N points. In other embodiments, greater or fewer that 25 N points may be used. The N points are predetermined, that is, the number and value of the engine speed points are predetermined. In an embodiment, the engine speed points are primarily selected in 5% intervals. The intervals are selected to provide the best linear interpolation. In other embodiments, intervals greater that 5% are employed. In yet other embodiments, intervals less that 5% are utilized.

Figure 2:
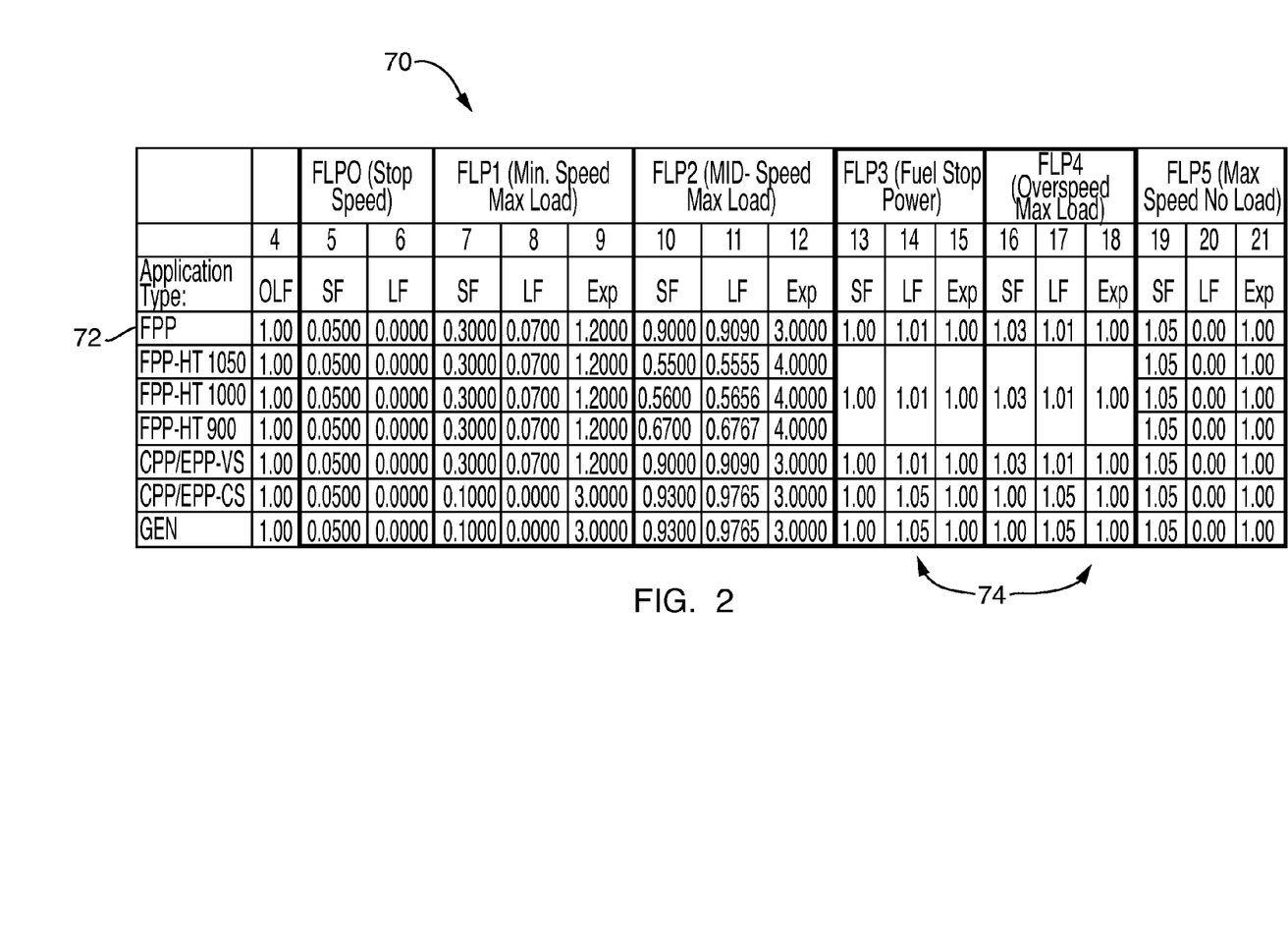
FIG. 2 is a table for use in determining engine fuel limits by application type according to the embodiment of FIG. 1.

The engine power map expression 60 allows for the calculation of engine application specific SFL points. Referring now to FIG. 2, an embodiment of the inventive method utilizes a table 70, referred to herein as power map or power map table, which contains a power/speed map for each engine application type 72. As shown in FIG. 2, the application types may include one or more of fixed pitch propeller (FPP), fixed pitch propeller high torque (FPP-HT), controllable pitch propeller/electrically powered propeller-variable speed (CPP/EPP-VS), controllable pitch propeller/electrically powered propeller-constant speed (CPP/EPP-CS), and/or auxiliary genset (GEN). As will be appreciated, these differing application types have different power and speed requirements and therefore use separate power maps.

The power map table 70 contains normalized units for each engine application type. Normalized units are utilized so that the power map table 70 may be used with any engine irrespective of engine model, number of cylinders, operating speed, and the like. In particular, the operating speed range of the engine is divided into five fuel limited power (FLP) regions or ranges, FLP0, FLP1 . . . FLP5. Each FLP region in the power map table 70 contains normalized speed factors (SF) and load factors (LF) as well as an exponent (EXP) for each application. The speed factor SF is normalized to MCR speed, i.e., the SF values are expressed as percentage of MCR speed. Similarly, the load factor LF values are normalized to MCR power, and are expressed as percentage of MCR power. Although an embodiment uses a power map containing normalized values for each application type, other non-normalized application power maps may be employed. The power map table may be stored as data in a non-transitory storage medium accessible by an ECU, or it may otherwise be electronically communicated to the ECU.

Referring back to FIG. 1, the power map variable 60 uses the SF, LF and EXP for a given FLP region and application type. That is, to obtain proper SF, LF and EXP factors from the power map table 70, the given engine speed point N must be compared to the SF values for the intended application. For example, if the N value is 0.75 for a FPP-HT application, then proper subscript is i=3 and all values are taken from the FLP3 column. In this example, the i−1 values would come from FLP2 section.

In embodiments, some values are user changeable or configurable to allow for field tuning of the transient response of an engine, whereas other values are not user changeable or configurable. Whether particular values are user configurable or not may depend on if they are emissions critical according to designated standards/operational rules. For example, in an embodiment, the SF and LF values in one or more FLP regions are user changeable/configurable to field tune an engine's transient response. More specifically, the parameters/values in FLP0, FLP1, FLP2, and FLP5 are considered non-emissions critical components (non-ECC) and may be user modified to alter the power map. FLP3 and FLP4 are considered emissions critical components 74 and the corresponding SF, LF and EXP values/parameters are hard coded into the engine control unit software. In embodiments, the engine speeds that include configurable parameters may vary, but it is envisioned that mid-speed range fuel limits are configurable.

Figure 6:
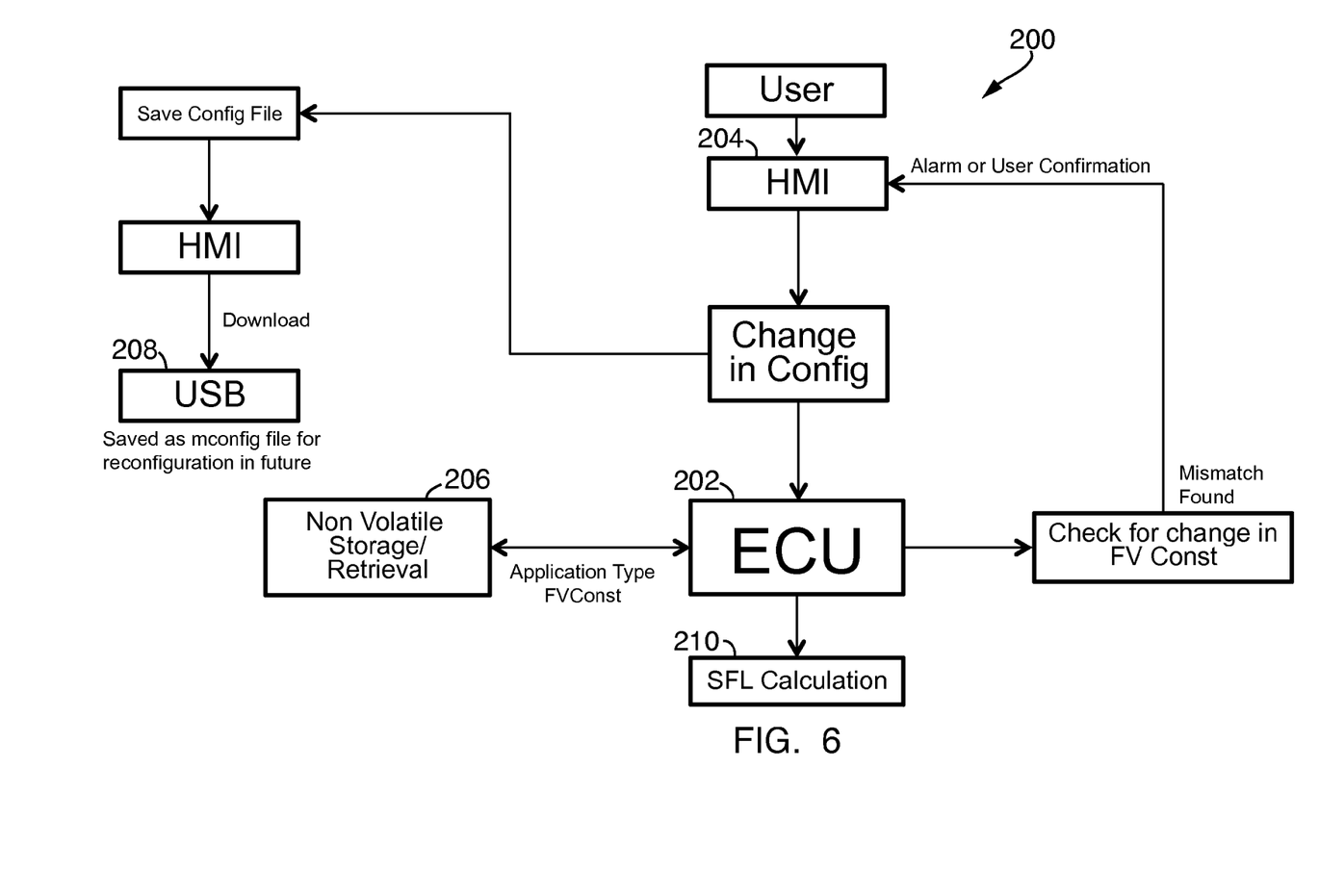
FIG. 6 is a schematic illustration of a system for determining engine fuel limits in accordance with an embodiment of the present invention.

As the non-ECC parameters are user modifiable, a range check is performed in certain embodiments. That is, if a user enters values for non-ECC parameters such as SF and LF wherein an upper limit is less than a lower limit, or there is a similar discrepancy, the user will be notified via an alarm or message delivered through a human machine interface (HMI). Similarly, an alarm or user confirmation may be triggered if there is a change in $FV_{CONSTANT}$ (FIG. 6).

Referring again to the SFL calculation 30, the equation also includes a fuel value scaler, FVS 54. The FVS is used to allow for field configurability of the $FV_{CONSTANT}$ value to account for inherent engine variability and engine wear, e.g., wear of fuel injection components, over time. As will be appreciated, wear on engine components can lead to decreases in maximum achievable power. Moreover, if engine parts are changed in the field, a reduction in maximum power may result. In an embodiment, the FVS may be adjusted within a range of +/−5 percent, though the default FVS is 1. As will be appreciated, other FVS ranges may be employed as long as the range ensures safe engine operation.

The SFL equation 30 also includes a fuel efficiency parameter which, in embodiments, is a brake specific fuel consumption equation, bsfc. In an embodiment, the calculation of bsfc uses one of the two equations reproduced below depending on the value of N.

$$\text{For } N \geq SF_2, bsfc = 200 \frac{g}{kW*hr}$$

For $N < SF_2$, $$bsfc = \left( \frac{450-200}{SF_0^{0.1} - SF_2^{0.1}} N^{0.1} + \frac{SF_0^{0.1}*200 - SF_2^{0.1}*450}{SF_0^{0.1} - SF_2^{0.1}} \right) \frac{g}{kW*hr}$$

More specifically, the fuel efficiency parameter, e.g., bsfc, may be selected based on the engine speed N. In an embodiment, the brake specific fuel equation used is based on speed dependent engine dynamics where, at relatively lower engine speeds, e.g., $N<SF_2$, the second equation is used. At relatively higher engine speeds, e.g., $N \geq SF_2$, the first equation is employed.

The SFL equation 30 also includes an overload load factor (OLF). In an embodiment, the OLF is 1 for all engine applications, although, as will be appreciated, the OLF may be varied depending on engine or application requirements.

Figure 3A:
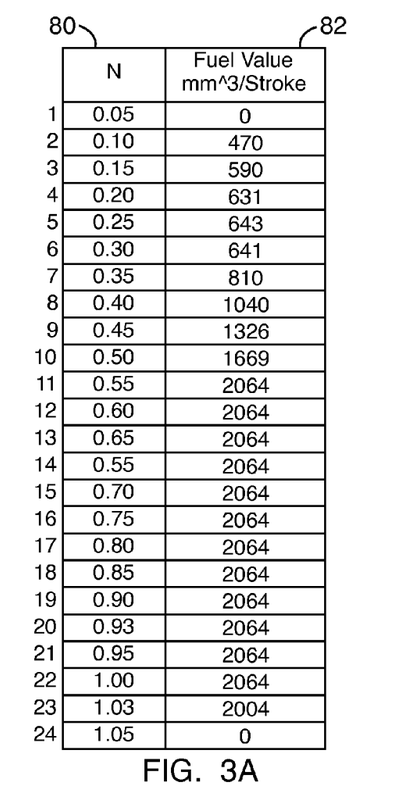
FIG. 3A is a table containing static fuel limits for use in creating a fuel limit curve according to the embodiment of FIG. 2.
Figure 3B:
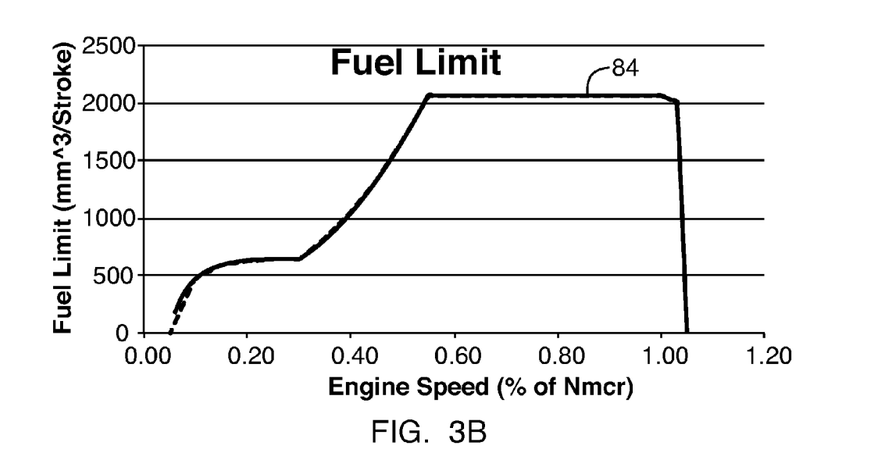
FIG. 3B is a fuel limit curve created with the static fuel limits of FIG. 3A.

As stated previously, the output from the SFL calculation includes a respective SFL point for each N engine speed point. This is depicted in FIG. 3A, which includes an SFL point 82, expressed as mm³/engine stroke, for each N point 80. The SFL points are plotted on a fuel limit curve 84, as shown in FIG. 3B. As shown, the fuel limit curve has engine speed on the x-axis and the fuel limits on the y-axis. In an embodiment, the ECU or other processor-based unit is configured to create the fuel limit curve through linear interpolation of the SFL and N points (e.g., 25 SFL and N points or otherwise). In certain embodiments, it may be possible to utilize other interpolation models.

Figure 4:
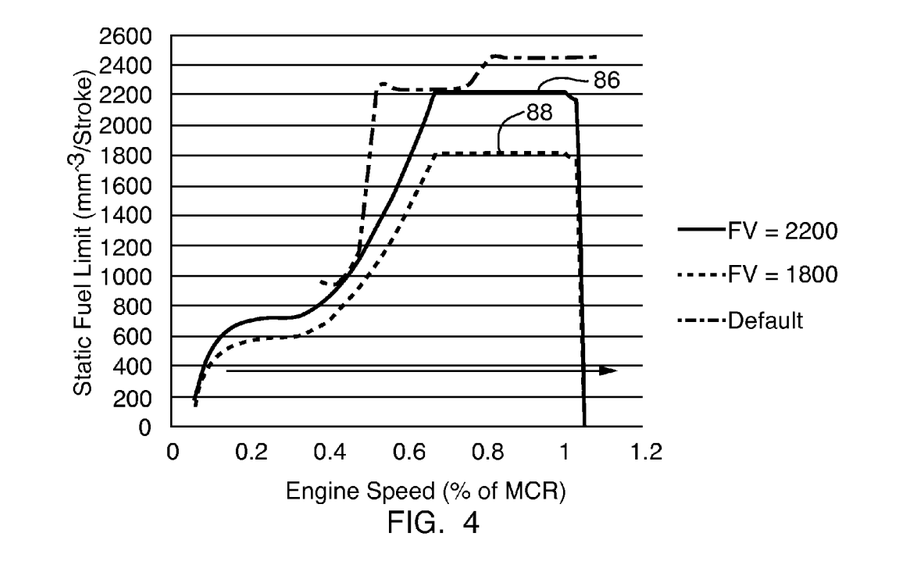
FIG. 4 is a graph containing fuel limit curves for two engines of the same type that have different fuel values, according to an embodiment of the present invention.

FIG. 4 shows an example of the SFL calculation for engines having different $FV_{CONSTANT}$ values. In particular, fuel limit curves 86, 88 for engines having a measured MCR fuel value of 2200 mm³/stroke and 1800 mm³/stroke, respectively, are depicted, as well as a default engine fuel limit curve. As shown, the inventive SFL calculation results in fuel limit curves 86, 88 that differ depending on the measured fuel value of the engine. Here, the engine with the higher MCR fuel value of 2200 has higher fuel limits at a given engine speed than does the engine that uses less fuel, 1800 mm³/stroke, at MCR.

Figure 5:
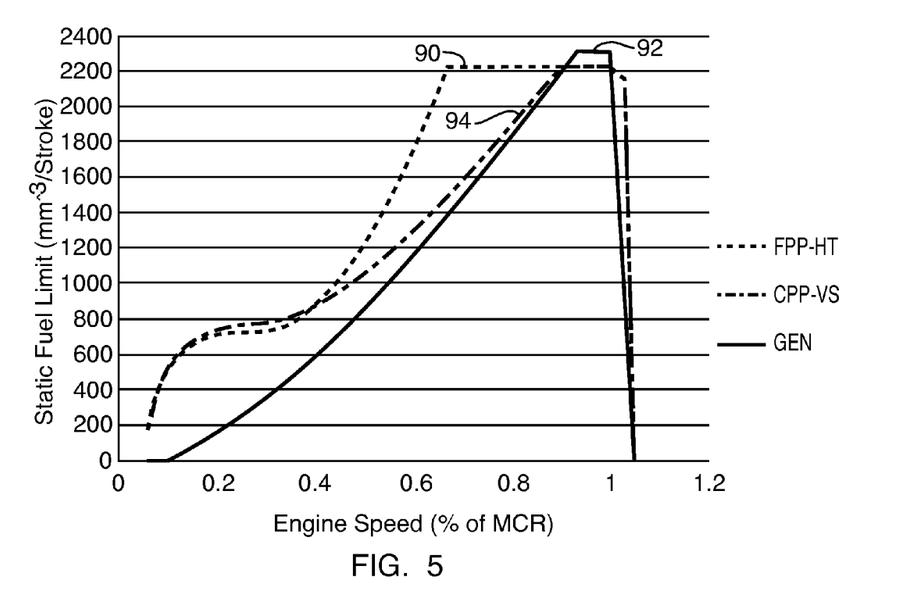
FIG. 5 is a graph containing fuel limit curves for three engines of the same type that are to be used for different application types, according to an embodiment of the present invention.

Turning now to FIG. 5, an example of the SFL calculation for engines having the same $FV_{CONSTANT}$ but different applications are shown. Here, the curves 90, 92, and 94 for engines used with applications FPP-HT, CPP-VS and GEN respectively. As shown, the fuel limits differ for these application types corresponding to the power requirements associated with each application. For both FIGS. 4 and 5, however, the engine power limits remain the same.

As shown in FIG. 6, an embodiment of the inventive system for determining engine fuel limits 200 includes an engine control unit (ECU) 202 operatively connected to an HMI 204. The HMI includes a screen and input device such as a keyboard and is operatively connected to a USB drive or other removable non-transitory/non-volatile storage 208.

As will be appreciated, the ECU 202 is co-located with the engine it controls, e.g., the ECU is located on board the vessel (or other vehicle), or in the case of a generator set, it is located in a housing/facility of the generator set. The ECU 202 is configured to control, among other things, the amount of fuel injected into the engine. In particular, the ECU 202 contains a processor that executes an embodiment of the inventive method of calculating fuel limits. In particular, the ECU 202 executes a program of instructions, i.e., algorithm, to perform the SFL calculation 210. The program of instructions is stored on the non-volatile storage device 206. In embodiments, the ECU may be a programmable.

In certain embodiments, the storage device 206 also contains the fuel value constant, $FV_{CONSTANT}$, as well as the application type for which the engine is being used. The storage device further includes FLP table 80. The HMI 204 may be used to configure the non-ECC FLP table parameters; the ECC parameters (SF, LF and EXP) for FLP3 and FLP4 are located on storage device 206, and, as mentioned above, are hard-coded and are not user modifiable.

Embodiments may also include a USB drive, which may be used to store configurable parameters so that they may be entered into the ECU in the field. The USB drive may also collect data regarding engine performance and the like and may also be used to update engine software.

Embodiments also employ an "mconfig" file which is a configuration file contains any user modified configurable parameters. The parameters are stored in the mconfig file to prevent the modifications from being lost during a software upgrade or reload, which would require reentry through the HMI.

Figure 7:
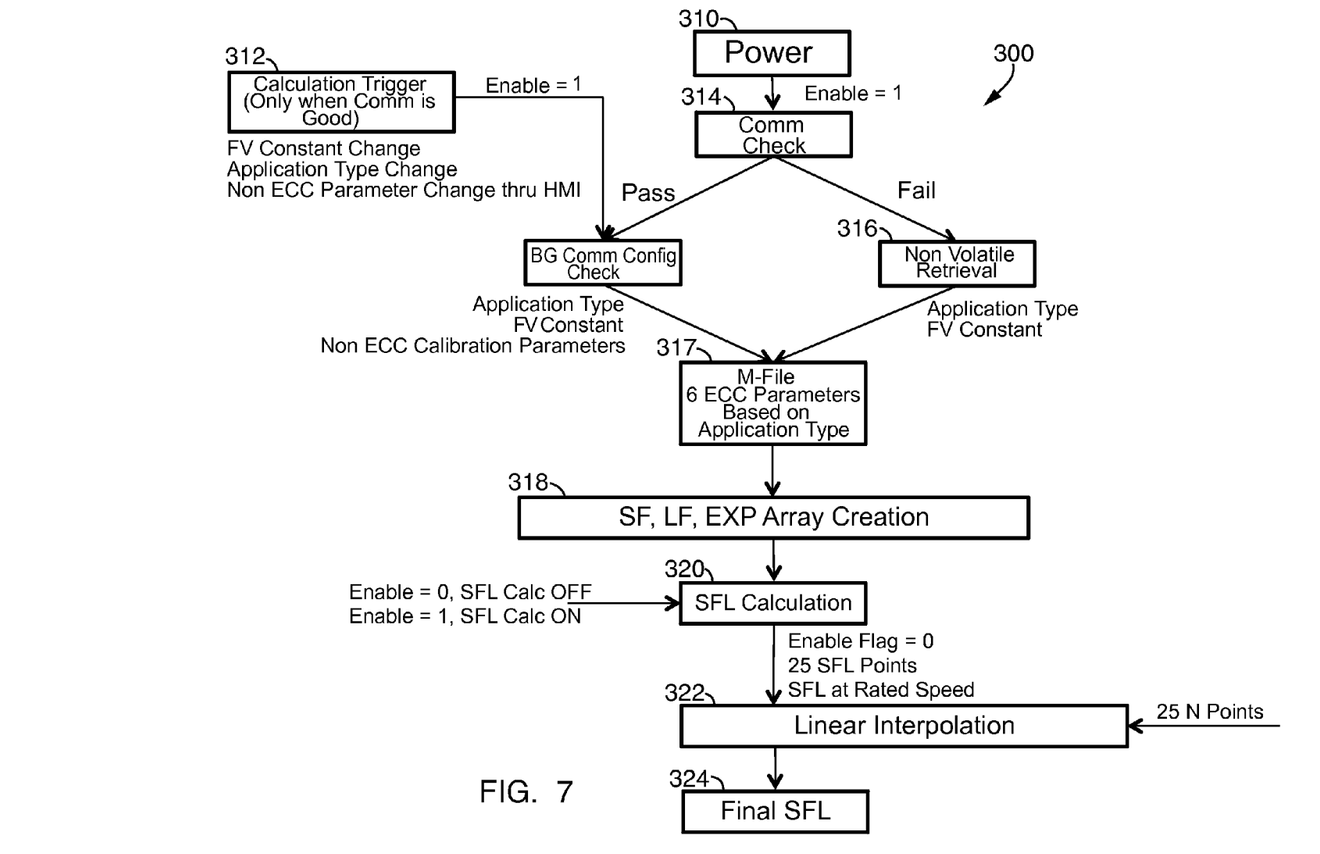
FIG. 7 is a flowchart illustrating a method for determining engine fuel limits according to an embodiment of the present invention.

Referring now to FIGS. 1 and 7, the operation of an embodiment of the present invention is described. As shown, the SFL calculation is triggered when the ECU is powered up (310) and when there is a change in the $FV_{CONSTANT}$, application type, Non-ECC parameters, and/or FVS through the HMI (312). In FIG. 7, enable=1 signifies that the SFL calculation 320 is on. In an embodiment, the SFL calculation is rerun after the initial power up calculation to account for any changes to configurable parameters. That said, the SFL calculation is switched off when not required so as to not burden the ECU.

Once the ECU is powered up, the system performs a communication check 314, to determine whether the ECU is operably communicating with the HMI. If so, the ECU will received a configuration file uploaded through the HMI with any changes to the user configurable parameters, e.g., $FV_{CONSTANT}$, application type, Non-ECC parameters and/or FVS. If there is no communication between the HMI and ECU, the ECU will retrieve application type and $FV_{CONSTANT}$ from non-volatile storage 206. In certain embodiments, the non-ECC parameters are also stored in non-volatile storage 206.

At this point, a modified configuration file (M-File) is created, containing any modifications to $FV_{CONSTANT}$, application type, Non-ECC parameters and/or FVS, and the ECC parameters for the application type are retrieved (317). If there have been no modifications to the aforementioned non-ECC parameters or application type, standard values for SF, LF and EXP are selected from power map table 80 based on the original engine application. An SF, LF and EXP array is then created at step 318.

At step 320, the SFL calculation occurs using the array from step 318. Subsequently, linear interpolation occurs at step 322 using the 25 N speed points (or other number of speed points) and the corresponding SFL points to produce a final SFL curve (324).

An embodiment relates to a method of determining fuel limits for an engine, e.g., the engine may be controlled based at least in part on the fuel limits that are determined. The method comprises measuring an actual fuel value for the engine, and creating a plurality of engine speed points. The method further includes calculating respective static fuel limit points for each of the engine speed points utilizing the actual fuel value. The static fuel limit points define and limit a rated power of the engine. In embodiments, the actual fuel value is obtained by measuring an amount of fuel consumed while the engine operates at its maximum continuous rated speed and load.

In embodiments, the method further includes creating a fuel limit curve from the static fuel limit points and engine speed points through linear interpolation. The fuel limit curve is used to control operation of the engine. In embodiments, the engine speed points are normalized to maximum continuous rated engine speed. In certain embodiments, the step of calculating a static fuel limit point for each engine speed point includes the steps of selecting a power map based on an engine application utilizing the power map to calculate the static fuel limit points. The power map may contain fuel limit regions containing normalized speed and load factors for multiple engine applications. At least one of the fuel limit regions may contain user configurable speed and load factors.

In embodiments, the step of calculating a static fuel limit point for each engine speed point includes the step of adjusting the actual fuel value by a fuel value scaler to account for changes in achievable engine power and may also include calculating brake specific fuel consumption and utilizing the brake specific fuel consumption to calculate the static fuel limit points.

In an embodiment, a method for modifying an engine fuel limit curve includes receiving, at an electronic control unit of an engine, a value for a configurable parameter into an engine's electronic control unit and calculating a static fuel limit point for each of a plurality of engine speed points utilizing an actual fuel value for the engine as well as the configurable parameter. The static fuel limit points define and limit the engine's rated power. The configurable parameter is a fuel value scaler, which adjusts the actual fuel value to account for changes in achievable engine power, or an application type for which the engine is to be used or a speed or load factor of an engine power map, or one or more of these. In certain embodiments, the method may also include interpolating the static fuel limit points and speed points to create a fuel limit curve that defines and limits the engine's rated power.

In an embodiment, an engine control system includes an engine control unit and a storage device electrically connected to the engine control unit. The storage device comprises a non-transient tangible medium having machine readable instructions stored thereon that when executed by the engine control unit cause the engine control unit to calculate respective static fuel limit points for a plurality of engine speed points utilizing an actual fuel value for an engine. The static fuel limit points define and limit a rated power of the engine. In embodiments, the system creates a fuel limit curve from the static fuel limit points and engine speed points through linear interpolation. In certain embodiments, the fuel limit curve may be modified by entering a value for at least one configurable parameter into the engine control unit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for determining fuel limits for an engine comprising the steps of:
measuring an actual fuel value for the engine by measuring an amount of fuel consumed while the engine operates at its maximum continuous rated speed and load;
receiving, at an engine control unit for the engine, the measured actual fuel value;
selecting a plurality of engine speed points;
calculating respective static fuel limit points for the engine speed points utilizing the actual fuel value; and
with the engine control unit, controlling the engine in dependence upon the calculated static fuel limit points;
wherein the static fuel limit points define and limit a rated power of the engine.

2. The method of claim 1 further comprising:
creating a fuel limit curve from the static fuel limit points and engine speed points through interpolation; and
controlling operation of the engine for driving a load based on the fuel limit curve.

3. The method of claim 1 wherein the engine speed points are normalized to maximum continuous rated engine speed.

4. The method of claim 1 wherein the plurality of engine speed points are from twenty to thirty engine speed points.

5. The method of claim 1 wherein the step of calculating the static fuel limit points for the engine speed points includes the steps of:
selecting a power map based on an engine application; and
utilizing the power map to calculate the static fuel limit points.

6. The method of claim 5 wherein the power map contains fuel limit regions containing normalized speed and load factors for multiple engine applications.

7. The method of claim 6 wherein at least one of the fuel limit regions contains user configurable speed and load factors.

8. The method of claim 5, wherein the engine application includes one or more of fixed pitch propeller, fixed pitch propeller high torque, controllable pitch propeller-variable speed, controllable pitch propeller-constant speed, and auxiliary genset.

9. The method of claim 5, wherein at least one of a speed factor of the engine power map or a load factor of the engine power map are changeable by a user.

10. The method according to claim 9, wherein the static fuel limits for the engine are automatically determined by an engine control unit associated with the engine when the at least one of the speed factor and the load factor are changed by a user.

11. The method of 1 wherein the step of calculating the static fuel limit points for the engine speed points includes the step of:
adjusting the actual fuel value by a fuel value scaler to account for changes in achievable engine power.

12. The method of claim 1 wherein the step of calculating the static fuel limit points for the engine speed points includes the steps of:
calculating brake specific fuel consumption; and
utilizing the brake specific fuel consumption to calculate the static fuel limit points.

13. The method of claim 1 further comprising the step of:
selecting a fuel efficiency parameter based on engine speed; and
utilizing the fuel efficiency parameter to calculate the static fuel limit points.

14. A method for modifying an engine fuel limit curve comprising the steps of:
receiving, at an electronic control unit of an engine, a value for a configurable parameter;
receiving, at the electronic control unit, and actual fuel valve for the engine, wherein the actual fuel value is obtained by measuring an amount of fuel consumed while the engine operates at its maximum continuous rated speed and load;
calculating respective static fuel limit points for a plurality of engine speed points utilizing the actual fuel value for the engine and the configurable parameter;
with the engine control unit, controlling the engine in dependence upon the calculated static fuel limit points;
wherein the static fuel limit points define and limit a rated power of the engine;
wherein the configurable parameter is at least one of a fuel value scaler which adjusts the actual fuel value to account for changes in achievable engine power, an application type for which the engine is to be used, a speed factor of an engine power map or a load factor of an engine power map.

15. The method of claim 14 wherein the static fuel limit points and speed points are interpolated to create a fuel limit curve that defines and limits the engine's rated power.

16. The method of claim 14 further including the step of controlling the engine to drive a load based on the static fuel limit points.

17. The method according to claim 14, wherein the engine fuel limit curve is modified automatically each time a configurable parameter is changed.

18. The method according to claim 14, wherein the application type for which the engine is to be used includes one or more of fixed pitch propeller, fixed pitch propeller high torque, controllable pitch propeller-variable speed, controllable pitch propeller-constant speed, and auxiliary genset.

19. An engine control system comprising:
an engine control unit; and
a storage device electrically connected to the engine control unit, the storage device comprising a non-transient tangible medium having machine readable instructions stored thereon that when executed by the engine control unit cause the engine control unit to calculate respective static fuel limit points for a plurality of engine speed points utilizing an actual fuel value for an engine and a value for a configurable parameter, the static fuel limit points defining and limiting a rated power of the engine;
wherein the configurable parameter includes at least an application type for which the engine is to be used and at least one of a fuel value scaler which adjusts the actual fuel value to account for changes in achievable engine power, a speed factor of an engine power map or a load factor of an engine power map.

20. The engine control system of claim 19 further comprising:
a human machine interface operatively connected to the engine control unit, the human machine interface allowing a user to selectively actuate the engine control unit to calculate static fuel limit points and/or to enter a value for the configurable parameter that may be used by the engine control unit to calculate the static fuel limit points and to modify the fuel limit curve based on the value.

21. The engine control system of claim 19, wherein the engine control unit is configured to create a fuel limit curve from the static fuel limit points and engine speed points through linear interpolation.

22. A method for determining fuel limits for an engine comprising the steps of:
measuring an actual fuel value for the engine;
selecting a plurality of engine speed points;
calculating respective static fuel limit points for the engine speed points utilizing the actual fuel value, including selecting a power map based on an engine application and utilizing the power map to calculate the static fuel limit points, and adjusting the actual fuel value by a fuel value scaler to account for changes in achievable engine power due to engine component wear; and
controlling operation of the engine in dependence upon the calculated static fuel limit points;
wherein the static fuel limit points define and limit a rated power of the engine; and
wherein the power map contains fuel limit regions containing normalized speed and load factors for multiple engine applications; and
wherein the static fuel limits are automatically calculated each time an engine control unit associated with the engine is powered up.

* * * * *